April 17, 1934.     H. C. GRAHAM     1,955,062
FASTENING DEVICE
Filed June 12, 1931
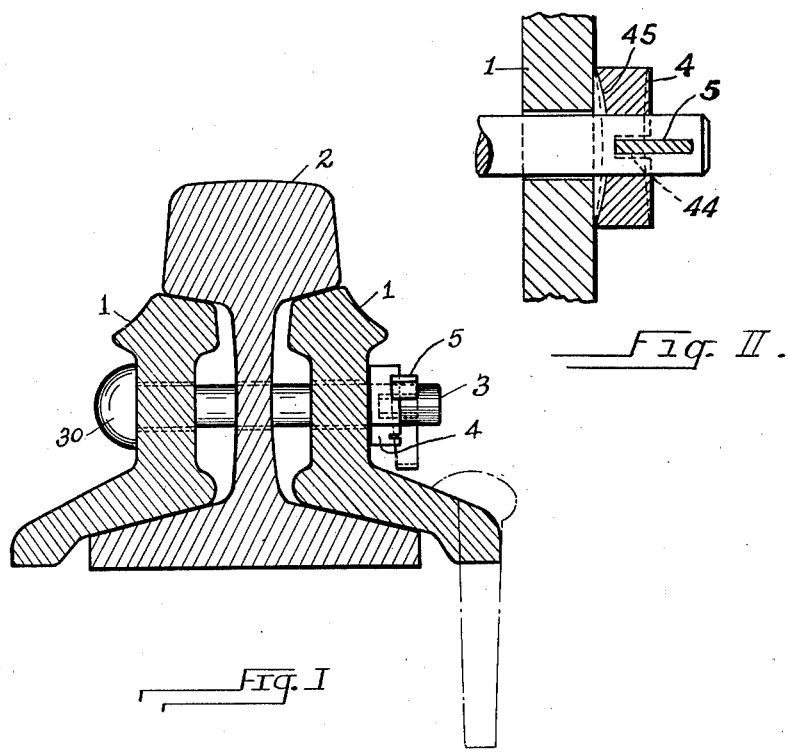
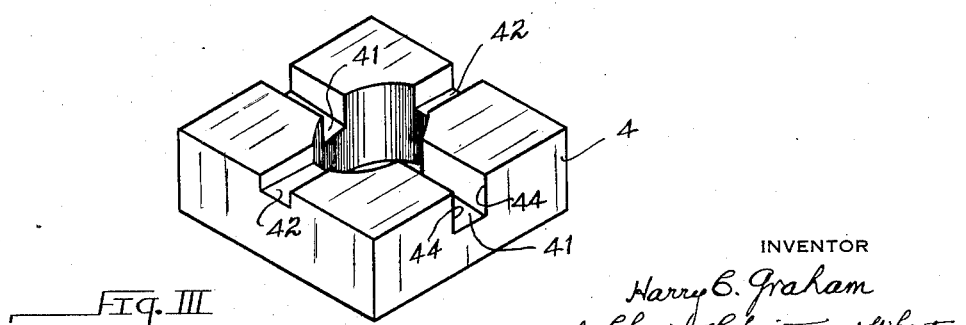
INVENTOR
Harry C. Graham
by Christy Christy and Wharton
his attorneys Patented Apr. 17, 1934

1,955,062

UNITED STATES PATENT OFFICE 1,955,062

FASTENING DEVICE

Harry C. Graham, Coraopolis Heights, Pa.

Application June 12, 1931, Serial No. 543,812

1 Claim. (Cl. 85—7)

This invention relates to improvements in fastening devices, and while it is not in its application limited to this particular situation, I shall show and describe it in its application in securing together the rails of a railway. The problem which has confronted, and which continues to confront, the designers of such railway equipment is to work out a fastener which shall be secure, easy of application, and easy of release. In a solution of that problem the invention is found.

In the accompanying drawing, Fig. I is a view in transverse section, showing the fastening device of the invention employed in securing the fish-plates of a rail-joint to the rails. Fig. II is a view to larger scale, showing fragmentarily and in section a detail of structure. Fig. III is a view in perspective and to larger scale of a certain follower block which forms part of the fastening device, as shown in Figs. I and II.

Referring first to Fig. I, two fish-plates 1, 1 are shown in position upon opposite sides of a rail 2. Two rails are set end to end, and the fish-plates may be understood to overlie the adjacent ends of the two rails. The fish-plates engage the rail heads from beneath, and the base flanges of the rails from above, and are secured by spikes to the cross-ties. The webs of the rails and of the fish-plates are perforate, and bolts 3, 3 penetrate the aligned bolt-holes, and these bolts with their accessories constitute the fastening means.

The bolt 3 is provided at one end with a forged head 30 by which it engages one of the assembled fish-plates. At the opposite end the shank of the bolt is slotted. The slot is preferably formed by punching the otherwise finished stem of the bolt, while the bolt still is hot. It is the outer bounding wall of the slot in the stem of the bolt which affords bearing surface for the wedge-key. The slot is so particularly placed that the loop it forms is strong to resist strain tending to tear it open (strain in left-to-right direction, Fig. I); and the outer wall of the loop (the wall at the right-hand end of the loop, Fig. I) in its transverse extent is preferably perpendicular to the axis of the bolt.

Co-operating with the slotted bolt, a follower block 4 and a wedge-key 5 are provided. The follower block is perforate, that the shank of the bolt may be passed through it, and is preferably provided with a central circular perforation of proper size to afford easy clearance for the bolt shank, but no more. The follower block in its outer periphery may be rectangular, polygonal, or circular; but, by virtue of its central perforation, it is an annulus, and in all its variety of shape it still is properly characterized as annular. This annular follower block is adapted over one face (the left-hand face, Fig. I) to engage the work to be secured; upon its opposite face it is adapted to be engaged by the wedge-key. The work-engaging face will, in its particular shape, conform generally to the surface of the work, and ordinarily, as in this case, will be substantially plane-surfaced, and its plane surface will extend perpendicularly to the axis of the perforation, and, accordingly, in the assembly, this work-engaging surface will extend in a plane perpendicular to the bolt axis. For purposes presently to be described, the surface departs slightly from a true plane, and is dished inwardly. The follower block accordingly engages the work first and with greatest pressure at the margin of the work-engaging face. This refinement in the shape of the follower block is shown in Fig. II.

The opposite face of the follower block is provided with a plurality of key-engaging surfaces. These surfaces are oblique to the general plane of the opposite, work-engaging face of the follower block, and, accordingly, they are, in the assembly, oblique to the axis of the bolt; and they are spaced at different intervals from the plane of the work-engaging face. These key-engaging surfaces are so arranged that each is interrupted by the perforation through the follower block, to the end that, in the assembly, the wedge-key, introduced through the slot in the bolt, shall have bearing upon the particular surface over two areas which lie on opposite sides of the perforation through which the bolt extends. In Fig. III, two such key-engaging surfaces, 41, 42 are shown. The key-engaging surfaces are shown to be formed by cutting channels in the substance of which the follower block is formed. These channels have opposite walls 44. If the follower block of the approximate proportions indicated in Fig. III, be formed of steel of suitable elasticity; if the work-engaging face be dished; and if the channels described be of such width that the introduced key passes snugly between the walls 44, 44, then, as the wedge-key is driven home, the follower block will be flexed, and the walls 44, 44 will close together, catching and securing the key in place between them.

The wedge-key 5 conveniently takes the form of a plate of steel of suitable thickness adapted to move in the slot formed in the shank of the bolt. It is of proper dimensions and its opposite edges extend in relative obliquity, and, preferably, the obliquity is of the same angular value as that of the surfaces 41, 42, etc. to the opposite work-engaging face of block 4. The edge surfaces of the wedge-key will ordinarily be machined, to suit them more perfectly to the intended service.

In making assembly, after the bolt has been introduced through the orifices in the assembly of rail and fish-plates, as shown in Fig. I, the bolt will be found to be so positioned that its slot is readily accessible for the introduction of the wedge-key (the position ordinarily will be one in which the breadth of the slot is oblique to the horizontal). The follower block then is applied to the bolt and turned until the desired one of the surfaces 41, 42, etc. is aligned with the slot in the shank of the bolt, and with the obliquity of the slot extending downwardly and outwardly. The wedge-key then is introduced, engaging, along its inner edge, the surface 41, 41 (42, 42) of the follower block and, along its outer edge the outer limiting wall of the slot in the shank of the bolt. The wedge-key then is driven home with a sledge, drawing the parts into snug and secure engagement. The follower block being dished on one face and grooved on the other, and being of proper elasticity, and being properly proportioned, the driving home of the wedge-key will effect a securing of it by the closing together of the slot walls. This is illustrated in Fig. II. The follower block 4 is here shown to be dished over its work-engaging face 45, and the channel in the follower block is shown to be of such extent that the introduced wedge-key 5 fits snugly within it. The follower block 4 will be understood to be formed of such resilient material as steel. In such case the driving of the wedge-key home will effect a deflection of the follower block. Its work-engaging face 45 will be flattened from the full-line to the dotted-line position, and, correspondingly, the walls 44 of the channel will be closed together and caused to engage more closely and to hold more securely the wedge-key 5. Another method of securing the key is by bending its tip aside, after it has been driven home. The fastening is released by driving the wedge-key in opposite direction.

If the parts be so particularly formed and proportioned that as the wedge-key is driven home the channel walls 44 do not close upon it, then the oblique position of the wedge plate (when the assembly has been completed in the manner described, and as shown in the drawing) may be found to be a feature tending to secure the wedge-key in place. Gravity then, acting on the wedge-key, particularly under the vibration which is incident to service, tends to shift the wedge-key downhill and to tighten it in its position.

The provision of a plurality of surfaces 41, 42, etc. adapts the device to practical conditions: both to the circumstance that the dimensions of the parts to be bolted vary, and to the further circumstance that manufacturing conditions forbid the formation of the parts of the securing device with utmost precision in proportions; furthermore, in the course of use, wear upon the parts when one of the surfaces 41, 42, etc., is engaged, may necessitate a resetting, in which another of the said surfaces may be engaged.

It will be perceived that, as the wedge-key is driven home, it is subjected to strains tending to bend it in the plane of its extent. Such bending, with binding contacts on its opposite wedge surfaces, may be effective in increasing its security in place.

This fastening device, designed primarily for securing together the rails of a railway, is available for general use: for example, in temporarily securing plates of metal together, which ultimately are to be riveted or welded.

I claim as my invention:

A fastening device including a bolt with slotted shank, the slot in the shank of the bolt being at the outer end defined by a wall adapted to be engaged by a wedge key, an annular follower block with opposite work-engaging and wedge-key engaging faces, the work-engaging face being dished, and the wedge-key engaging face being formed with a plurality of diametrically extending, open-ended grooves of unequal depth and of width such as under the compressive strain of service to close upon an introduced wedge key, and a wedge key with opposite surfaces of relative obliquity adapted in the assembly simultaneously to engage the end wall in the slot in the bolt shank and the bottom of an aligned groove in the follower block, and by virtue of such engagement to exert, when advanced, compressive strain.

HARRY C. GRAHAM.